3,565,769
METHOD AND APPARATUS FOR DETERMINATION OF HYDROGEN CONTENT IN A HIGH TEMPERATURE FLUID
Robert B. Holden, Westchester County, N.Y., and Morris Kolodney, River Edge, N.J., assignors to United Nuclear Corporation, Elmsford, N.Y., a corporation of Delaware
Filed Oct. 17, 1967, Ser. No. 675,960
Int. Cl. B01d 59/40
U.S. Cl. 204—1
20 Claims

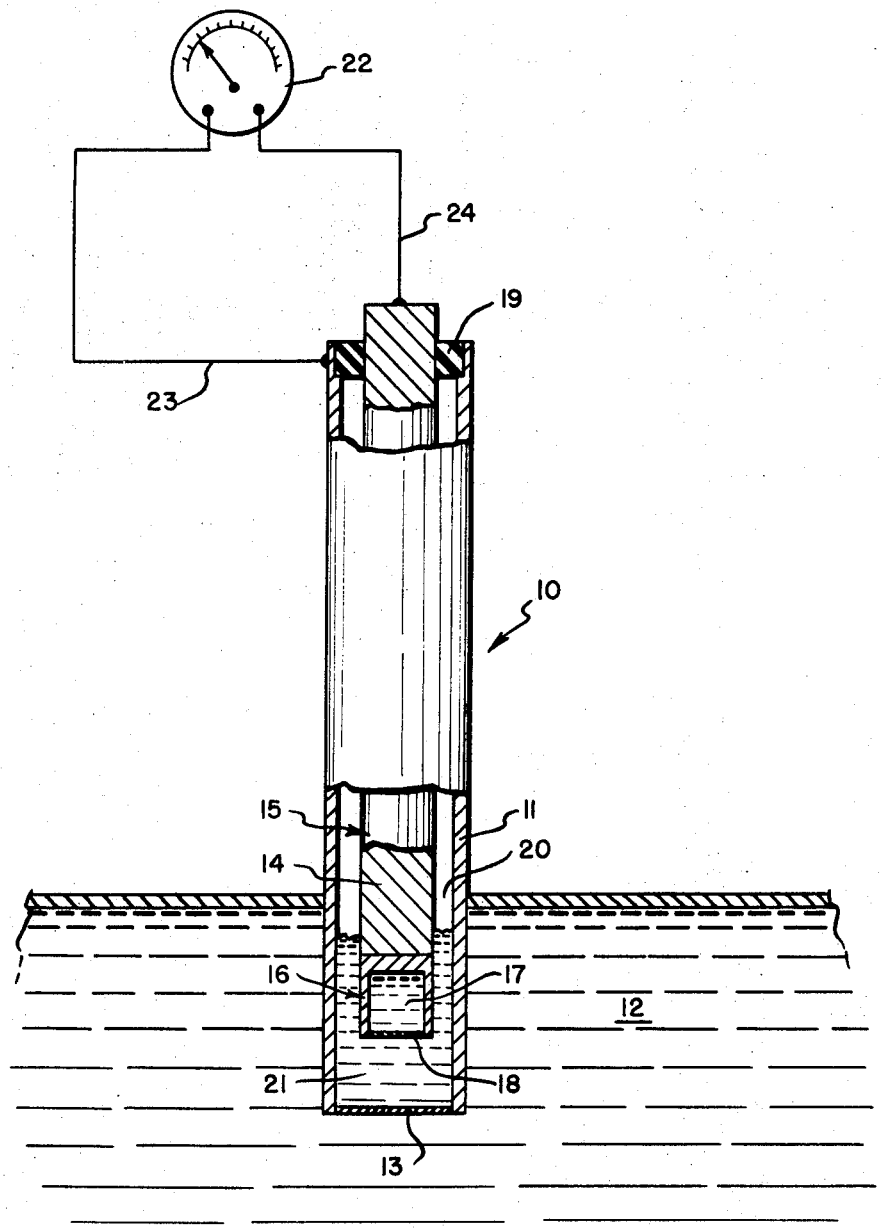

ABSTRACT OF THE DISCLOSURE

The hydrogen content in a high temperature fluid such as liquid sodium is measured by immersing thereinto a probe to form an equilibrium electrolytic cell. The probe is in the form of a metallic closed-end tube impervious to the fluid but permeable to hydrogen. Inside the tube is a hydrogen reference electrode electrically insulated therefrom and is filled with a fused salt electrolyte doped with an alkali metal hydride.

BACKGROUND OF THE INVENTION

(I) Field of the invention

This invention relates to the determination of hydrogen content in a high temperature fluid using an equilibrium electrolytic cell, the EMF of which corresponds to the hydrogen content in the fluid. More particularly, it relates to the type of hydrogen monitoring device disclosed in the co-pending application of Robert B. Holden Ser. No. 501,139, filed Oct. 22, 1965 (now U.S. Pat. 3,410,780), entitled "Electrochemical Hydrogen Meter."

(II) Description of the prior art

The hydrogen content in a high temperature fluid can be determined by standard analytical techniques such as by chemical analysis, chemical absorption, heat of combustion and thermal conductivity. The prior methods, however, were not readily adaptable for use in continuous analyses and generally were suitable only for measuring the hydrogen concentrations in gases. Continuous monitoring high temperature fluids such as liquid metals, heretofore, used method that required expensive and elaborate test equipment and relied on principles which had many inherent disadvantages, particularly for determining hydrogen contents in liquid alkali metals.

The need for a simple, economical and yet reliable method for measuring hydrogen content in high temperature fluids, particularly liquid metal, is increasing for a number of reasons. For example, liquid metals such as liquid sodium and liquid NaK are the preferred coolants for fast breeder reactors and for some other nuclear reactors and the tolerance for hydrogen in the liquid metal used as coolants for the aforesaid systems is very low.

In certain nuclear reactors, the need for continuous monitoring hydrogen content arises because of the migration of hydrogen from hydride nuclear fuels into the coolant and thence to the power conversion system which is undesirable. Similarly in reactors which contain structural materials that absorb hydrogen, such as niobium, vanadium, and zirconium, the hydriding potential of the liquid metal is of great significance because of potential embrittlement of the structural metal or the nuclear fuel cladding. In the latter case, very small concentrations of hydrogen may be dangerous. It is also important to measure the hydrogen content in liquid sodium used as coolant in a breeder reactor system because of the possibility of plugging by sodium hydride and because it may act as an indicator of sodium-to-water leaks in steam generators.

In addition, the hydrogen content of sodium may have a major effect upon the activity of other impurities, such as carbon with which it may combine to form methane.

Heretofore, for continuous monitoring hydrogen content of sodium, two types of sensors for the in-line detection or measurement of hydrogen have been used. Both types of sensors depend upon the diffusion of hydrogen out of sodium and through a nickel diaphragm to a means of detection. The first of these consists of a nickel thimble positioned in the sodium line. The interior of the thimble is connected to a vacuum system equipped with a pressure gauge. The operation of this type of detector is based on the fact that the injection of hydrogen into the sodium is followed by a rise in pressure of the gauge. Although this type of detector initially was intended as a detector to provide warning of water leakage, it obviously has the capability of indicating ingress of substantial quantities of hydrogen irrespective of the source.

The second device, consists of a nickel-plated palladium coil immersed in the sodium. The nickel protects the palladium from attack by the sodium. Hydrogen diffusion through both the nickel and the palladium is catalytically oxidized to water in an oxygen stream passing through the tube. The concentration of the water in the oxygen stream then is taken as a measure of the hydrogen content of the sodium.

Both of these continuous monitoring devices are, in essence, hydrogen extractors and suffer from the disadvantage that they do not measure directly the activity of the hydrogen in the sodium. In the first type, a pressure is measured and in the second the concentration of water in oxygen is measured. In each case, the measurement depends upon the rate at which hydrogen diffuses through the barrier. As such they are susceptible to error and instability if service conditions alter the permeability of the nickel diaphragm, for example, by film formation or by changes in the microstructure or composition.

A second aspect of hydrogen monitoring by extraction is that, in principle, it must always change the hydrogen concentration in the region being measured. In a large system where the sodium is moving rapidly past the sensor this effect, or course, will be insignificant. However, in a smaller system, or in relatively stagnant sodium, this can be a serious perturbation.

SUMMARY OF THE INVENTION

We have now discovered that the hydrogen content in a high temperature fluid can be determined simply and effectively without disturbing the hydrogen concentration in the system being monitored by the method and apparatus of this invevention which is based on an equilibrium galvanic measurement. Broadly stated, the method of this invention requires the establishment of a sensing electrode by contacting a first electrically conductive element with the fluid whose hydrogen content is to be measured. The conductive element used is impervious at the contacting area to the fluid and at least a portion of said area is permeable to hydrogen. A reference electrode is formed by contacting a second electrolytically conductive element with a source of hydrogen. A portion of the second element that is contacted with the source of hydrogen is permeable to hydrogen. The hydrogen source comprises an alkali metal and alkali metal hydride or an alkaline earth metal and alkaline earth metal hydride or mixtures thereof and has a predetermined pressure or activity. The sensing and the reference electrodes are joined at areas permeable to hydrogen with an electrolyte which contains hydrogen ions and conducts substantially solely by ion transport thereby forming an electrolytic cell. The EMF of the cell which correlates with the hydrogen content of the fluid is measured in a conventional manner.

Advantageously, the method of this invention is carried out using an apparatus which has a metallic probe adapted for contacting the fluid at one side of its surface. The wall of the probe is impervious at the contacting area to the fluid and at least a portion of the area is a septum permeable to hydrogen. Spaced apart and electrically insulated from the wall of the probe is a reference electrode in the form of a conductive element which is in contact with a hydrogen source of predetermined activity confined in a chamber at least a portion of whose wall is permeable to hydrogen. An electrolyte which contains hydrogen ions and conducts substantially solely by ion transport is used to join the reference electrode and the probe by contacting the areas where the hydrogen is permeable thereby forming a cell when the probe is in contact with the fluid. Conventional voltage measuring means are connected to the probe and the electrode to determine the EMF of the cell which corresponds to the hydrogen content in the fluid in equilibrium with the probe.

Preferably the hydrogen source of the reference electrode is an alkali metal having a predetermined amount, advantageously a saturated or an oversaturated amount of alkali metal hydride, or is an alkaline earth metal having a predetermined amount of an alkaline earth metal hydride, or is a mixture of these hydrogen-containing substances. The electrolyte is preferably a fused salt such as an alkali metal halide, an alkaline earth halide, or a mixture of said halides doped with an alkali metal hydride in an amount generally above about 0.2% by weight which is sufficient to provide an adequate hydrogen ion conductance and a required hydrogen ion conductive mechanism for the electrolyte.

Depending on factors such as diffusivity and permeability of the septa of the probe for hydrogen and on the electrolyte used, the method and hence, the apparatus of this invention may be used to measure hydrogen content of a fluid at an elevated temperature as low as 200° C. and is suitable for measuring hydrogen concentration and its thermodynamic activity to lower levels than gauges based on other principles briefly described hereinabove.

BRIEF DESCRIPTION OF THE DRAWING

The accompanying single sheet of drawing illustrate schematically an apparatus for measuring hydrogen content of a high temperature fluid in accordance with the present invention.

DESCRIPTION OF THE PREFERRED EMBODIMENT

As shown in the drawing, the apparatus 10 comprises a metallic probe 11 adapted for immersing into the liquid metal 12, which, preferably, is in the form of a tube closed with a metallic septum 13 which is impervious to the liquid metal but permeable to hydrogen. Inside the hollow probe 11 is a reference electrode 14 which comprises an electrically conductive cylindrical element 15 the lower end of which is integrally bonded to a cylindrical chamber 16 containing a source of hydrogen 17. The chamber 16 is also equipped with a metallic septum 18 at its bottom which is permeable to hydrogen but impervious to alkali metals, hydrides and salts.

The reference electrode is concentrically positioned within and mounted on the hollow probe 11 at the upper end with an insulating material 19, thus electrically insulating the probe from the reference electrode. The annular space 20 between the probe and the reference electrode is partially filled with an electrolyte 21 to a height extended above chamber 6. The EMF of the electrolytic cell is measured with a conventional potentiometer 22 which is connected to the probe and the reference electrode by wires 23 and 24 respectively.

Advantagously the cylindrical casing of the probe 11 is constructed from a metal which is substantially inert and impervious to the high temperature saturate fluid. The metallic septum 13 may be made from the same material as the one used for the cylindrical casing but from thinner stock so the hydrogen permeation is improved. For liquid alikali metal, we found iron, nickel, vanadium, cobalt and their alloys to be particaulrly suitable for the construction of the casing and the septum.

The electrically conductive element 15 as well as the chamber 16 can be any metal which is substantially inert at the environment being used. Metals similar to the ones mentioned above can also be used for the probe 11. The metallic septum 18, of course, should be made of thin stock which possess the aforesaid high hydrogen permeations.

The hydrogen source 17 for the reference electrode 14, preferably, is in the form of a fused alkaline earth metal saturated or oversaturated with alkaline earth hydrides which can be prepared by reacting alkaline earth metal with hydrogen until precipitation of the hydride, for example, hydrogenation of Ca will form a Ca—$CaH_2$ two phase mixture. The alkaline earth metal-alkaline earth metal hydride (saturated) hydrogen source has a constant pressure or activity at a constant temperature, thus is ideal for use as a reference electrode when the apparatus of the invention is used for measuring fluid at sufficiently high temperature to cause fusion of one phase of the two phase mixture. Alternatively, the reference electrode may be in the form of an alkali metal in equilibrium with its hydride, such as Na—NaH (saturated). In addition, the hydrogen source for the reference electrode may comprise mixtures of alkali metals and alkaline earth metals in equilibrium with their respective hydrides.

A solid type of hydrogen source for the reference electrode may be also used. Examples of this type are combinations of calcium-hydrogen, zirconium-hydrogen, yttrium-hydrogen, as well as other metal and metal hydride two phase mixtures.

The electrolyte suitable for the present invention is a fusible salt or a mixture of salts, having therein one or more ionic hydrides. Many fusible salts that dissolve the ionic hydrides are suitable for use in combination with said hydrides. Preferably the fusible salts or the mixtures of salts are selected from alkali metal and alkaline earth metal halides. Electrolytes that are prepared from mixtures of the aforesaid halides, particularly eutectic mixtures, are desirable since they have a definite fusion point, generally lower than the single salts. Advantageously, the halides are chlorides or bromides. The selection of the particular fusible salt or a mixture of salts in combination with the ionic hydrides, is dependent, to a large extent, on the fusion temperature of the salts, which must be lower than the temperature of the fluid being measured. The preferred liquid type of electrolytes for use at above 350° C. is LiCl—KCl eutectic containing LiH, NaH, or $CaH_2$ in solution; and at above 320° C. is LiBr—KBr eutectic containing LiH, NaH, or $CaH_2$ in solution. Other than LiH, NaH and $CaH_2$, ionic hydrides that are suitable for use as ionic conductors in the electrolyte include $SrH_2$, $BaH_2$, KH, RbH and CsH.

The hydride or hydrides dissolved in the fused salts are ionized and provide the required hydrogen ions in the salt and the ionic conductive mechanism. Electrolysis of the dissolved hydride in a suitable alkali metal salt or a mixture of salts will lead to the discharge of hydrogen at the anode only, which is indicative that the hydrogen is present as the negative H⁻.

The enabling mechanism and the theory governing the method and the apparatus of this invention may be explained with reference to the drawing by the following specific example. In this example, the septa 13 and 18 are nickel disks, the electrolyte 21 is a LiCl—KCl eutectic (melting point about 350° C.) having dissolved therein about 5% by weight of NaH and the source of the hydrogen 17 is a two phase Ca—$CaH_2$ (saturated) mixture. The apparatus 10 as shown is immersed in liquid sodium whose hydrogen concentration is being detected.

The outer septum 13, after being immersed in the sodium for a short period comes to equilibrium with the liquid sodium so that the hydrogen actvity is the same in both. For the purpose of illustration, let this activity correspond to concentration C. The inner septum 18 similarly acquires a hydrogen concentration, $C_o$, characteristic of the material (i.e., Ca+CaH₂) contacting it. The results is an electrolytic cell which may be written in the following form:

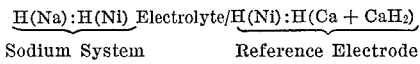

$$\underbrace{H(Na):H(Ni)}_{\text{Sodium System}}\; Electrolyte/\underbrace{H(Ni):H(Ca+CaH_2)}_{\text{Reference Electrode}}$$

At the sensing electrode (the probe 11) H(Ni, concentration C)+$e$=H⁻(Electrolyte)

At the reference electrode 15 H⁻(Electrode)—$e$=H(Ni, concentration $C_o$)

The overall virtual cell reaction is simply the nominal transfer of hydrogen from the sodium to the calcium (or other reference electrode metal). The actual transfer of hydrogen is substantially zero, because the measurement is potentiometeric with extremely low current flows. The cell voltage, E, is given by the Nernst expression:

$$E = \frac{RT}{\mathcal{F}} \ln \frac{[H]_{Na}}{[H]_{ref.}}$$

or $$\ln[H]_{Na} = \frac{E\mathcal{F}}{RT} + \ln[H]_{ref.}$$

where brackets denote chemical activity, R is the gas constant, T is the absolute temperature, and $\mathcal{F}$ is the Faraday constant. Since $[H]_{ref.}$ is known from existing thermodynamic data, the hydrogen activity in the sodium is obtained directly from the voltage measurement. The activity is immediately related to the "hydriding potential" of the hydrogen, so that the voltage measures an extremely important thermodynamic property of the system directly. In some applications it is desirable to express the measurements in terms of concentrations rather than activities. At low concentrations of hydrogen in sodium, Henry's law applies:

$$[H]_{Na} = kC$$

where

C=concentration, e.g. in p.p.m.
$k$=The Henry's law constant.

Since the Henry's law constant is available, at least approximately, from the sodium-hydrogen phase diagram, the concentration of hydrogen may be evaluated from the measurement of cell voltage in the range over which Henry's law applies. In actual practice, such a hydrogen sensor will be calibrated with sodium of known hydrogen concentration to verify the predicted signal.

The effect of concentration change upon voltage is very substantial. For example, at 750° F. (673° K.), a 10% change in concentration will produce a voltage change of about 6 millivolts—a very easily measured quantity.

The effect of temperature fluctuations may be determined from the Gibbs-Helmholtz relationship if known data permit a calculation of the entropy change associated with the cell reaction. In practice, again, the effect of temperature is verified by direct measurement.

The potential of the inner reference electrode 15 vs. electrolyte interface will be constant at constant temperature. However, the potential of the interface between the electrolyte and the outer probe 11 depends upon the hydrogen content of the sodium. When a change is made in the concentration of hydrogen in sodium, this change must be communicated to the electrolyte by diffusion through the tube wall. The time required to achieve the fraction $f$ of the total expected change on the inside of a thin-walled tube is given to a good approximation by $$t = \frac{4L^2}{\pi^2 D} \ln \frac{4}{(1-f)}$$

where $t$=time
L=wall thickness
D=diffusivity.

Diffusivity data are available for hydrogen in various metals at various temperature ranges. For example, at about 400° C. the diffusivity in alpha iron is about 1.4×10⁻⁴ cm.²/sec. Assuming a wall thickness of about 0.010 in. (0.0254 cm.) for the outer tube and assuming that the detectable change of hydrogen concentration is 10%, the time required would be in the order of three seconds. Although the diffusivity of hydrogen in nickel is somewhat lower than in iron, the response time with nickel septa is acceptable.

The preferred embodiment of this invention is very small, less than 1 inch in diameter and less than 6 inches long and the response time is fast, generally better than about 5 seconds and is capable of detecting a lower concentration of hydrogen in liquid metal less than about 1 p.p.m.

We claim:
1. A method for measuring the hydrogen content of a hydrogen-containing fluid at an elevated temperature of above about 200° C. which comprises:
   establishing a sensing electrode by contacting a first electrically conductive element with said fluid whose hydrogen content is to be measured, said first element being impervious to the fluid and at least a portion of said first element in contact with said fluid being permeable to hydrogen;
   establishing a reference electrode by contacting a second electrically conductive element with a source of hydrogen, at least a portion of said second element in contact with said source of hydrogen being permeable to hydrogen, said source of hydrogen comprising a solution of an alkali metal hydride in the corresponding alkali metal or an alkaline earth metal hydride in the corresponding alkaline earth metal or mixtures thereof and having a predetermined pressure;
   joining the portions of said sensing and reference electrodes permeable to hydrogen with a liquid electrolyte which contains hydrogen ions and conducts substantially solely by ion transport, thereby forming an electrolytic cell; and
   determining the EMF of the cell which correlates with hydrogen content of said fluid.

2. A method according to claim 1 wherein said fluid is a liquid metal.

3. A method according to claim 1 wherein said fluid is molten sodium.

4. A method according to claim 1 wherein the alkali metal or alkaline earth metal is saturated with said hydride.

5. A method according to claim 1 wherein the electrolyte is selected from a group consisting of alkali metal halides, alkaline earth halides, and a mixture of said halides, said electrolyte containing hydrogen at a concentration sufficient to provide an adequate hydrogen ion conductance for the required hydrogen ion conductive mechanism.

6. A method according to claim 5 wherein the hydrogen in the electrolyte is provided by the presence therein of above about 0.2% by weight of an alkali metal hydride or an alkaline earth metal hydride or a mixture thereof.

7. A method according to claim 1 wherein the first electrically conductive element is a metallic element selected from the group consisting of iron, nickel, vanadium, cobalt, or one of their alloys; wherein the hydrogen source for the reference electrode comprises a hydrogen-containing alkali metal, alkaline earth metal or a mixture thereof having a predetermined hydrogen activity, the hydrogen source being confined within a chamber having walls at least a portion of which is permeable to hydrogen; and wherein the electrolyte comprises a fused salt selected from a group consisting of alkali metal halides, alkaline earth halides, and a mixture of said halides, said electrolyte containing hydrogen ions at a concentration sufficient to provide an adequate hydrogen ion conductance for the required hydrogen ion conductive mechanism.

8. A method according to claim 7 wherein the liquid metal is sodium.

9. A method according to claim 7 wherein the hydrogen-containing alkali metal or alkaline earth metal of the reference electrode is a two phase mixture containing a saturated or an oversaturated amount of an alkali metal hydride or an alkaline earth metal hydride, respectively, and wherein the halide or halides of the electrolyte contains above about 0.2% by weight of an alkali metal hydride or an alkaline earth metal hydride or a mixture thereof.

10. A method according to claim 7 wherein the halide is bromide or chloride.

11. A method according to claim 7 wherein the metallic element of the sensing electrode is iron.

12. An apparatus for measuring the hydrogen content of a fluid which comprises:
- a metallic probe suitable for contacting said fluid at one end of its outer surface, said probe being impervious to the fluid and at least a portion of said probe in contact with the fluid being a septum permeable to hydrogen in said fluid,
- a reference electrode spaced apart from said probe, said electrode comprising an electrically conductive element having a chamber containing a hydrogen source with a predetermined activity and in direct contact with said electrically conductive element, said chamber having at least a portion of its wall permeable to hydrogen, said hydrogen source comprising a hydrogen-containing alkali metal, alkaline earth metal or a mixture thereof;
- an electrolyte positioned within the space between the probe and said reference electrode and in direct contact with the septum of said probe and with the portion of the wall of said chamber of the reference electrode permeable to hydrogen, said electrolyte comprising a liquid containing hydrogen ions and conducting substantially solely by hydrogen ion transport; and
- means for measuring the EMF between the probe and the reference electrode when said probe is in contact with the fluid.

13. An apparatus according to claim 12 wherein the fluid is liquid metal.

14. An apparatus according to claim 12 wherein the alkali metal or alkaline earth metal is saturated or oversaturated with its hydride.

15. An apparatus according to claim 12 wherein the electrolyte is selected from the group consisting of alkali metal halides, alkaline earth metal halides and a mixture of said halides, said electrolyte containing hydrogen at a concentration sufficient to provide an adequate hydrogen ion conductance for the required hydrogen ion conductive mechanism.

16. An apparatus according to claim 15 wherein the electrolyte comprises above about 0.2% by weight of an alkali metal hydride or an alkaline earth metal hydride or a mixture thereof.

17. An apparatus for measuring the hydrogen content of a liquid metal which comprises:
- a hollow metallic probe adapted to be immersed into the liquid metal, the immersed portion of said probe being impervious to the liquid metal and having at said portion an outer septum permeable to the hydrogen;
- a reference electrode positioned within said probe and electrically insulated therefrom, said reference electrode comprising an electrically conductive element having a chamber containing a hydrogen source, said hydrogen source comprising an alkali metal or an alkaline earth metal or a mixture thereof containing hydrogen having a predetermined hydrogen activity and being in direct contact with said electrically conductive element, the wall of said chamber being impervious to said alkali metal and having an inner septum permeable to hydrogen;
- an electrolyte filling at least a portion of the space within said probe in an amount sufficient to join the septa, said electrolyte comprising one or more alkali metal halides and alkaline earth metal halides containing hydrogen ions at a concentration sufficient to provide an adequate hydrogen ion conductance for the required hydrogen ion conductive mechanism; and
- means for measuring the EMF between the probe and the reference electrode after the probe is immersed in the liquid metal and the hydrogen content of the outer septum is in equilibrium with the hydrogen content of the liquid metal, said EMF corresponding to the hydrogen content in said liquid metal.

18. An apparatus according to claim 17 wherein the liquid metal is sodium, wherein the hydrogen source for the reference electrode comprises a two phase mixture containing alkali metal or alkaline earth metal saturated or oversaturated with an amount of an alkali metal or alkaline earth metal hydride or a mixture of alkali metal or alkaline earth metal hydrides, and wherein the halide or halides of the electrolyte contains more than about 0.2% by weight of an alkali metal or alkaline earth metal hydride or a mixture of alkali metal or alkaline earth metal hydrides.

19. An apparatus according to claim 18 wherein the halide is bromide or chloride.

20. An apparatus according to claim 19 wherein the metal for the probe is iron, nickel, vanadium, cobalt or one of their alloys.

References Cited

UNITED STATES PATENTS

| | | | |
|---|---|---|---|
| 2,882,212 | 4/1959 | Beard | 204—195 |
| 2,886,497 | 5/1959 | Butler | 204—1.1 |
| 3,297,551 | 1/1967 | Alcock | 204—1.1 |
| 3,325,378 | 6/1967 | Greene et al. | 204—1.1 |

TA-HSUNG TUNG, Primary Examiner

U.S. Cl. X.R.

204—195